(No Model.)
J. KRUSE.
PHOTOGRAPHIC SHUTTER.
No. 561,672.  Patented June 9, 1896.
Fig. 1.
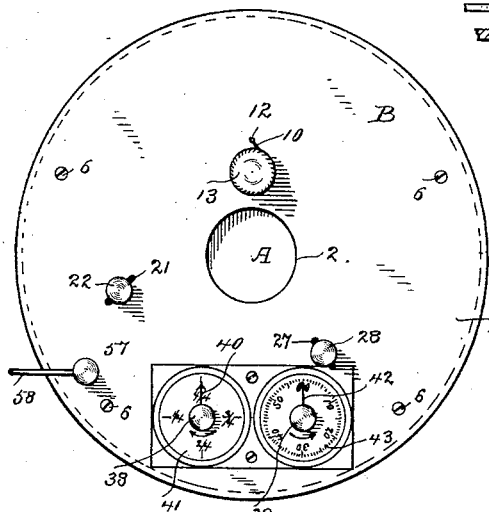
Fig. 6.
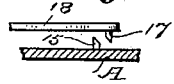
Fig. 2.
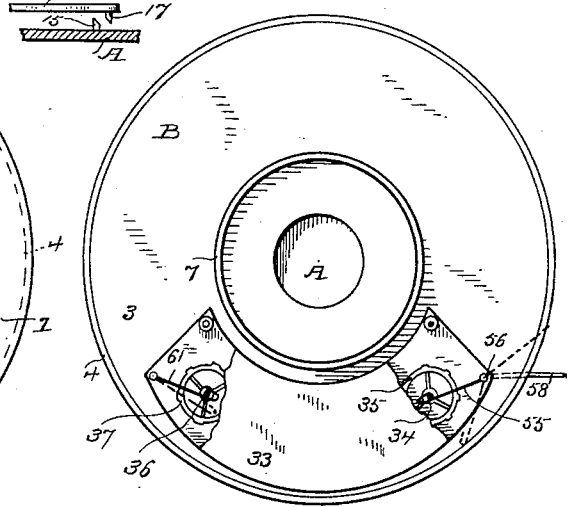
Fig. 4.   Fig. 7.   Fig. 5.
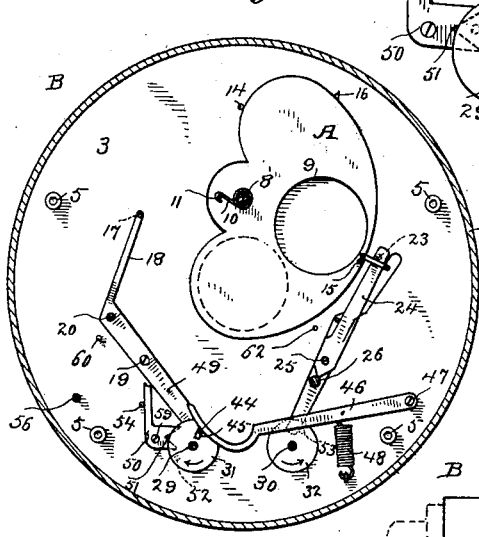
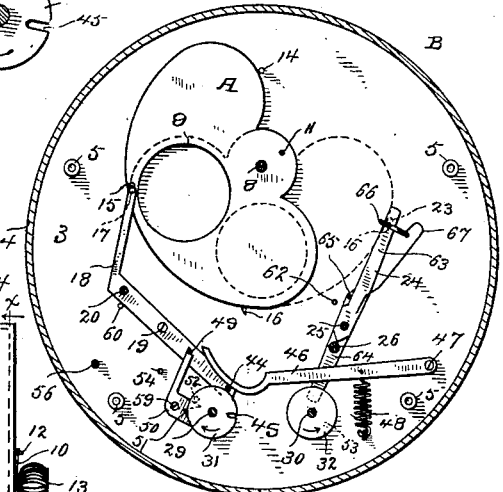
Fig. 3.
WITNESSES
H. H. Lantz
Lucile V. Bayliss
INVENTOR
John Kruse
By A. M. Wooster
Atty.

UNITED STATES PATENT OFFICE.

JOHN KRUSE, OF WATERBURY, CONNECTICUT.

PHOTOGRAPHIC SHUTTER.

SPECIFICATION forming part of Letters Patent No. 561,672, dated June 9, 1896.

Application filed September 11, 1895. Serial No. 562,149. (No model.)

*To all whom it may concern:*

Be it known that I, JOHN KRUSE, a citizen of the United States, residing at Waterbury, in the county of New Haven and State of Connecticut, have invented certain new and useful Improvements in Time Opening and Closing Shutters for Cameras; and I do hereby declare the following to be a full, clear, and exact description of the invention, such as will enable others skilled in the art to which it appertains to make and use the same.

My invention has for its object to produce an automatic shutter for cameras which shall be adapted to be used as a time opening or a time closing shutter or both a time opening and a time closing shutter, or as an ordinary shutter, both the opening and the closing of which may be controlled by the operator.

With these ends in view I have devised the novel construction of which the following description, in connection with the accompanying drawings, is a specification, letters and numerals being used to designate the several parts.

Figure 1 is a front elevation of the shutter-casing, my novel shutter being in the closed position; Fig. 2, a rear elevation of the shutter-casing, the case inclosing the time-movements being partially broken away; Fig. 3, an edge view of the shutter-casing, the lens-tube of a camera appearing in dotted lines; Fig. 4, a section on the line x x in Fig. 3, the shutter being in the closed position; Fig. 5, a similar view showing in full lines the shutter in the set position and in dotted lines the position of the shutter when in the open position; Fig. 6, a detail view illustrating the position of the parts at the instant the shutter is about to be locked in the set position, and Fig. 7 is a detail view illustrating one position of the time opening mechanism.

It is of course well understood that it is common in the art to designate not only the shutter proper but the accompanying parts which operate and carry it as the shutter.

In order to secure perfect clearness of description in this specification I shall designate the shutter proper as A and the shutter-casing as a whole as B.

The shutter-casing consists of a front plate 1, having a central opening or sight 2, a back plate 3, and a circular flange 4 between the plates, said front and back plates with flange 4 constituting the closed case in which the operative parts of the device are inclosed.

5 denotes standards which are rigidly secured in the back plate and are engaged by screws 6, passing through the front plate. These standards strengthen and support the front and back plates and make the shutter-casing perfectly rigid in use. Upon the outer side of the back plate is a flange 7, which is adapted to engage the lens-tube of the camera, which appears only in dotted lines in Fig. 3. The shutter is carried by a stud 8, journaled in the holder.

The exact shape of the shutter is not of the essence of my invention, although I preferably make it of substantially the configuration illustrated in Figs. 4 and 5. It is simply necessary that the shutter be provided with an opening 9, adapted to register with opening 2 in the front plate, and also that it be made large enough to completely cover opening 2 in the front plate when turned in either direction, as in the set or in the closed position.

In Fig. 4 I have shown the shutter in the closed—*i. e.*, the normal—position in which position it is held by a spring 10. I have shown for this purpose an ordinary coil-spring, one end of which is attached to the shutter, as at 11, the other end being attached to the front plate, as at 12.

In Fig. 5 I have indicated by dotted lines the position of the shutter when open and have shown in full lines the shutter in the set position, in which position it may be placed by rotation of stud 8, a knob 13 being provided on said stud on the outer side of the front plate for convenience in manipulation. The shutter is stopped at the extreme of its movement in either direction by a pin 14 in the back plate. (See Figs. 4 and 5.) The shutter itself is provided in its face with a pin 15 and in its periphery with a pin 16. The shutter is locked at the set position—*i. e.*, the position shown in full lines in Fig. 5—by the engagement of pin 15 with a pin 17 on the outer side by a lever 18, which is pivoted to the back plate, as at 19. This lever is provided with a stud 20, which passes through a slot 21 in the front plate and is provided at its outer end with a knob 22, which lies outside of the front plate. This stud is provided for convenience in releasing the shutter, so that spring 10 will throw the shutter to the open position when it is not desired to use the time setting mechanism, which I shall presently describe. Either pin 15 or pin 17 or both are beveled, (see Fig. 6,) so as to permit pin 15 to pass pin 17 when the shutter is moved to the set position, the end of lever 18 which carries pin 17 springing upward slightly to permit pin 15 to pass.

The shutter is locked at the open position— i. e., the position indicated by dotted lines in Fig. 5—by the engagement of pin 16 on the periphery of the shutter with a pin 23 on the under side of a lever 24, which is pivoted to the back plate, as at 25. This lever is provided with a stud 26, which passes through a slot 27 in the front plate and is provided at its outer end with a knob 28, which lies outside of the front plate. This stud is provided for the purpose of releasing the shutter from the open position, so that spring 10 will throw the shutter to the closed position when it is not desired to use the time closing mechanism, which I shall presently describe.

29 denotes a shaft carrying a disk 31, the action of which is to release the shutter when in the set position after a predetermined time shall have elapsed, and 30 a time-shaft carrying a disk 32, the action of which is to release the shutter when in the open position after a predetermined time shall have elapsed, spring 10 acting, when the shutter is in the set position and is released, to carry it to the open position, and acting again when it is in the open position and is released to carry it to the closed position.

Time-shafts 29 and 30 are controlled by clock-movements which I have shown as inclosed in a case 33.

I have not illustrated or described the time-movements themselves for the reason that so far as my present invention is concerned any movements that may be wound by partial rotation of their shafts in one direction and will carry the shafts in the opposite direction at the desired rate of speed when released will accomplish the purpose of my invention.

34 denotes the balance-wheel shaft and 35 the balance-wheel belonging to the movement which carries time-shaft 29, and 36 the balance-wheel shaft and 37 the balance-wheel belonging to the movement which carries time-shaft 30.

Time-shafts 29 and 30 both extend through the front plate, shaft 29 being provided with a knob 38 and shaft 30 with a knob 39 for convenience in manipulation. Shaft 29—i. e., the time opening-shaft—carries a pointer 40, which moves over the face of a dial 41, preferably graduated to fractions of a minute. Time-shaft 30 carries a pointer 42, which moves over the face of a dial 43, preferably graduated to seconds.

44 denotes a pin extending from lever 18, which is adapted to rest on the periphery of disk 31 and to engage a notch 45 in said disk and which is itself engaged by a lever 46, carried by a shaft 47, journaled in the back plate and case 33, said lever being held in contact with the pin by a spring 48. Lever 18 is also provided with a pin 49, which is adapted to be engaged by one arm of a bell-crank lever 50, pivoted to the back-plate, as at 59, the other end of said bell-crank lever being provided with a V-shaped notch 51. On the under side of disk 31 is a pin 52, (see dotted lines, Figs. 4 and 5,) which is adapted when moving in one direction to engage the end of the bell-crank lever not in engagement with pin 49 and when moved in the opposite direction to engage notch 51, as will presently be fully explained.

53 (see dotted lines, Figs. 4 and 5) denotes a pin on the under side of disk 32, which is adapted to engage one arm of lever 24, as will be more fully explained.

The operation is as follows: Suppose that the operator desires to open the shutter at his convenience and to regulate the exposure in accordance with his judgment. The operator moves the shutter to the set position by means of knob 13, this movement being against the power of spring 10. When he desires to open the shutter, he releases it from the set position by means of knob 22, which moves lever 18, releases the shutter by disengagement of pins 15 and 17, and permits spring 10 to throw the shutter to the open position, in which position it is stopped by the engagement of pin 16 with pin 23 on lever 24. When the operator desires to terminate the exposure, he does so by means of knob 28, which moves lever 24 and disengages pins 16 and 23, thereby releasing the shutter and permitting spring 10 to carry it to the closed position. Suppose now that the operator desires to have the shutter open automatically at the expiration of a predetermined time. The operator first sets the shutter as before, and then sets shaft 29 by means of pointer 40. I have shown a dial graduated to fractions of a minute and use in connection with said dial a time-movement which will produce a rotation of shaft 29 in one minute.

In order that I may be enabled to increase the time before the shutter will open automatically to a period greater than a minute, although the shaft makes a complete revolution in one minute, I have provided bell-crank lever 50 and pin 49 on lever 18. The parts of the time opening mechanism are shown in their normal position in Figs. 1 and 4. It will be noticed that bell-crank lever 50 is out of engagement with pin 49, the backward movement of said lever being limited by a pin 54. The arrows in Figs. 4, 5, and 7 indicate the direction of movement of disk 31 after the time-movement has been set and released, the manner of which will presently be explained. The movement of the disk in setting is therefore the reverse of the direction indicated by the arrow. Suppose, for example, that the time to which the shutter-opening mechanism is to be set is less than one minute. By that I mean any time that will not require that disk 31 be given an entire revolution in setting. Under such conditions bell-crank lever 50 will remain inoperative. Suppose, however, that the time required to elapse before the shutter opens automatically is more than a minute. This would require more than a complete revolution of shaft 29 and disk 31. In setting, when disk 31 was nearing the completion of its first revolution, bell-crank lever 50 being in the position shown in Figs. 4 and 7, pin 52 would pass into V-shaped notch 51 and would engage the opposite wall of the notch. (See Fig. 7.) This would swing bell-crank lever from the position shown in Figs. 4 and 7 to the position shown in Fig. 5 and would place it in engagement with pin 49 on lever 18, as is clearly shown in Fig. 5. Pin 52, when bell-crank lever 50 is placed in engagement with pin 49, will not be in the position shown in Fig. 5, but approximately in the position shown in Fig. 4. Pin 52 would not reach the position shown in Fig. 5 until disk 31 had been moved to the extreme limit of its movement in its second revolution, which would give fully a minute and three-quarters as a time to elapse after the time-movement was set in motion before the shutter would automatically open. After the shutter has been locked at the set position and after the time opening-movement has been set should the operator require additional time—as, for example, in arranging a group—he may get all the time necessary by locking the time opening-movement in the set position. This may be accomplished by any simple device.

I have shown a device for locking the time opening-movement consisting of a hooked spring 55, carried by a shaft 56, journaled in the back plate and case 33. At the outer end of this shaft and on the outer side of the front plate is a head 57, which is shown as provided with an arm 58 for convenience in manipulation. Hooked spring 55 locks the time opening-movement by engagement with balance-wheel shaft 34.

In Figs. 1 and 2 the time opening-movement is shown as locked against movement, the operator having swung arm 58 from the position shown in dotted lines in Fig. 2 to the position shown in full lines in said figure. The hooked end of the spring has sprung past the balance-wheel shaft and has clamped said shaft between the hooked end and the opposite side of the spring, as clearly shown in Fig. 2, with sufficient pressure to hold the balance-wheel shaft against movement—in other words, with sufficient pressure to overcome the power of the spring of the time-movement, which is not shown in the drawings. Suppose, furthermore, that the operator having arranged his group desires to place himself in it. He then releases the time-movement by moving arm 58 from the position shown in full lines in Fig. 2 to the position shown in dotted lines in said figure. This movement of the arm will cause the hooked end of the spring to spring past the balance-wheel shaft, thereby releasing the latter. After releasing the time opening mechanism the operator still has the time which he allowed himself in setting the time opening mechanism to place himself in the group before the shutter will automatically open. As already stated, if this time is less than one minute bell-crank lever 50 will remain inoperative. It should be remembered that Fig. 4 shows the parts in the normal—i. e., the inoperative—position. When the operator locks the shutter in the set position, he swings lever 18 backward until it is stopped by pin 60. This places pins 15 and 17 in alinement, as in Fig. 6, so that they will engage, and also moves pin 44 out of notch 45 in disk 31 and lifts lever 46 from the position shown in Fig. 4 to the position shown in Fig. 5. It will furthermore be remembered that in setting, shaft 29 and disk 31, carrying pin 52, are rotated in the direction opposite to the arrow. When, therefore, the time opening mechanism is released, disk 31 will be carried in the direction of the arrow by the spring of the time-movement, (not shown,) which will carry pin 52 from the position at which it has been placed in setting to the position shown in Fig. 4, at which instant pin 44 will be in alinement with notch 45, and spring 48, which acts upon lever 46, itself in engagement with pin 44, will move said pin into notch 45, as in Fig. 5, which will move lever 18 from the locking position, as in Fig. 5, to the unlocking position, as in Fig. 4—in other words, will disengage pins 17 and 15 by moving pin 17 out of alinement with pin 15. This releases the shutter and permits spring 10 to throw it to the open position, as already described. Suppose now that the operator desires to have as much time as possible elapse before the time opening-movement is released. Instead of stopping the rotation of shaft 29 and disk 31 in setting when the disk has made an entire revolution he will carry it past the starting-point and will continue the second revolution of said shaft and disk until the parts are stopped by the engagement of pin 52 with the opposite side of bell-crank lever 50, which will then be in its operative position, as shown in Fig. 5.

I will now describe how bell-crank lever 50 is placed in its operative position. When shaft 29 and disk 31 are nearing the completion of the first revolution in setting, pin 52 will pass into the V-shaped notch (see Fig. 7) and will engage the opposite side of the notch. This will swing the bell-crank lever from the position shown in Fig. 4 to the position shown in Fig. 5. The effect of this movement will be to lock levers 18 and 46 in the position shown in Fig. 5 and retain them there until bell-crank lever 50 is thrown to its normal position and lever 18 is released. Suppose now that the shutter is locked in the set position, the time opening-movement is set for a greater period of time than one minute, and that the time opening-movement is released. At the commencement of the movement notch 45 will be in, approximately, the position shown in Fig. 5, but not necessarily as far up, that being the extreme position. When notch 45 in the return movement comes in alinement with pin 44, said pin will not drop into the notch, owing to the fact that lever 18 will be held at the raised position by bell-crank lever 50. The movement of shaft 29 and disk 31 will therefore continue. During this revolution of the disk, however, pin 52 will pass into the V-shaped notch, moving in the direction of the arrow, and will engage the opposite side of the notch, which disengages bell-crank lever 50 from pin 49. Lever 18 will still be held up, however, as pin 44 rests on the periphery of disk 31. As soon, however, as notch 45 comes a second time into alinement with pin 44, bell-crank lever 50 now being out of the operative position, pin 44 will be thrown into notch 45 through the action of spring 48 and lever 46, which will disengage pins 15 and 17 and permit spring 10 to throw the shutter to the open position, as already explained.

Having explained how the shutter is automatically released and thrown to the open position, I will now explain how the shutter is automatically released a second time and thrown to the closed position, which terminates the exposure. This is effected by the mechanism which I have termed the "time closing mechanism." 61 denotes a hooked spring carried by shaft 47 and adapted to engage shaft 30—i. e., the time closing-shaft—in precisely the same manner that hooked spring 55 engages shaft 29, the only difference being that in the case of the time opening mechanism the time mechanism is released mechanically, and in the case of the time closing mechanism the time mechanism is released automatically. Shaft 47 rotates in its bearings in the back plate and case 33. As lever 46 and hooked spring 61 are both fixed to this shaft, it follows that when pin 44 is brought into alinement with notch 45 and is forced into said notch by the action of spring 48 on lever 46 the movement of said lever will also move the hooked spring. In Fig. 2 I have shown in full lines the locking position of hooked spring 61 and in dotted lines the unlocking position of said spring.

It will of course be obvious that when the shutter is locked in the set position, which necessitates the movement of lever 18 from the position shown in Fig. 4 to the position shown in Fig. 5, pin 44 will act to lift lever 46, which will swing hooked spring 61 from the position shown in dotted lines in Fig. 2 to the position shown in full lines in said figure. This will lock the time closing-movement in the same manner that the time opening-movement is locked by hooked spring 55. The time closing-movement is set by turning shaft 30 by means of knob 39 in the opposite direction from that indicated by the arrow. Dial 43 is graduated to seconds, and the exposure, after the shutter is thrown to the open position and the time closing mechanism released, will be the number of seconds which pointer 42 takes in traveling from the position at which it has been set to the position in which it is shown in Fig. 1—i. e., its normal position.

In Fig. 5 I have shown the position of lever 24 when the shutter is locked at the open position and in Fig. 4 the position of lever 24 after the shutter has been released. The release of the shutter is effected by the engagement of pin 53 on disk 32 with lever 24, this engagement serving to oscillate said lever from the position shown in Fig. 5, in which pin 16 on the shutter is in engagement with pin 23 on said lever, to the position shown in Fig. 4, in which the movement of the lever has carried pin 23 out of alinement with pin 16 and has permitted spring 10 to throw the shutter to the closed position. In order that I may be enabled to give an entire turn to disk 32, so as to give an exposure of full sixty seconds, if necessary, I have made lever 24 in two parts, which are indicated, respectively, by 63 and 64. These two parts both turn on pivot 25.

65 denotes a pin extending upward from part 64, which acts as a stop to limit the movement of part 63 in one direction.

67 denotes a spring one end of which is secured to a loop 66 and the other to part 63, the action of which is to hold part 63 in engagement with pin 65, but leaving part 64 free to be oscillated slightly on pivot 25 independently of part 63 should disk 32 be given an entire revolution, which would place pin 53 in engagement with the inner side of part 64 of the lever. I have shown the upper end of part 63 as inclosed in the loop, thus making the latter serve as a stop to limit the inward movement of lever 24 when it is swung to the locking position. The inward independent movement of part 64 when it is engaged by pin 53 is limited by a pin 62 in the back plate. The engagement of part 64 with this pin prevents the possibility of disk 32 being given more than an entire revolution in setting.

Having thus described my invention, I claim—

1. The combination with a shutter-casing having a sight 2, and a spring-actuated shutter which covers the sight in the set and in the closed positions and is provided with an opening 9 which registers with the sight in the open position and a pin 15, of a lever 18 provided with a pin 17 adapted to be engaged by pin 15 to lock the shutter at the set position, means for oscillating said lever to disengage said pins whereby the shutter is released from the set position and means for stopping the shutter at the open position.

2. The combination with a shutter-casing having a sight 2, and a spring-actuated shutter which covers the sight in the set and in the closed positions and is provided with an opening 9 which registers with the sight in the open position and a pin 15, of a lever 18 provided with a pin 17 adapted to be engaged by pin 15 to lock the shutter at the set position and time-controlled mechanism for oscillating said lever to disengage said pins whereby the shutter is released from the set position and means for stopping the shutter at the open position.

3. The combination with a spring-actuated shutter having an opening 9 and a pin 15, of a lever 18 provided with a pin 17 adapted to be engaged by pin 15 to lock the shutter at the set position and a pin 44, a time-controlled disk 31 having a notch 45 and means for forcing pin 44 into the notch when in alinement whereby the lever is oscillated and the shutter released from the set position.

4. The combination with a shutter-casing and a spring-actuated shutter having an opening 9 and a pin 15, of a lever 18 provided with a pin 17 adapted to be engaged by pin 15 to lock the shutter at the set position, a pin 44 and a pin 49, a time-controlled disk 31 having a notch 45 and a pin 52, means for forcing pin 44 into the notch when in alinement for the purpose set forth and a bell-crank lever 50 one arm of which is adapted to engage pin 49 to retain the lever in the setting position, the other arm being provided with a V-shaped notch 51, said parts being so arranged that when disk 31 is nearing the completion of the first revolution in setting pin 52 will enter the V-shaped notch and swing the bell-crank lever into engagement with pin 49 and in the return movement when said disk is nearing the completion of the first revolution pin 52 will enter the V-shaped notch and will disengage the bell-crank lever from pin 49.

5. The combination with a shutter-casing and a spring-actuated shutter having an opening 9, and a pin 15, of a lever 18 provided with a pin 17 adapted to be engaged by pin 15 to lock the shutter at the set position and a pin 44, a time-controlled disk 31 having a notch 45 and a spring-actuated lever 46 bearing upon pin 44 to force it into the notch when in alinement, so that the lever will be oscillated and the shutter released from the set position.

6. The combination with a shutter-casing and a spring-actuated shutter having an opening 9 and a pin 15, of a lever 18 provided with a pin 17 adapted to be engaged by pin 15 to lock the shutter at the set position and a pin 44, a time-controlled disk 31 having a notch 45, a spring-actuated lever 46 bearing upon pin 44 to force it into the notch when in alinement, means for stopping the shutter at the set position, time-controlled mechanism for releasing the shutter from the open position and a hooked spring 61 operated by lever 46, said spring being caused to lock the time-controlled mechanism for releasing the shutter from the open position when the shutter is placed in the set position and to release said time-controlled mechanism when lever 46 is oscillated through the engagement of pin 44 with notch 45.

7. The combination with a shutter-casing and a spring-actuated shutter having an opening 9 and a pin 16, of means for locking said shutter at the set position, time-controlled means for releasing said shutter from the set position, a lever 24 having a pin 23 which is engaged by pin 16 to lock the shutter in the open position and time-controlled mechanism by which said lever is oscillated to disengage the pins and release the shutter from the open position.

8. The combination with a shutter-casing and a spring-actuated shutter having an opening 9 and pins 15 and 16, of a lever 18 having a pin 17 adapted to be engaged by pin 15 to lock the shutter at the set position, time-controlled mechanism which causes lever 18 to release the shutter from the set position, lever 24 having a pin 23 which is engaged by pin 16 to stop the shutter in the open position and time-controlled mechanism acting to oscillate lever 24 to release the shutter from the open position.

9. The combination with a shutter-casing and a spring-actuated shutter having an opening 9 and pins 15 and 16, of a lever 18 having a pin 17 adapted to be engaged by pin 15 to lock the shutter at the set position and a pin 44, a time-controlled shaft carrying a disk 31 having a notch 45, a spring-actuated lever 46 bearing upon pin 44 to force it into the notch when in alinement so that the lever will be oscillated and the shutter released from the set position, lever 24 having a pin 23 which is engaged by pin 16 to stop the shutter in the open position, time-controlled shaft 30 carrying a disk 32 having a pin 53 which is adapted to oscillate lever 24 to release the shutter from the open position and a hooked spring 61 carried by lever 46 which engages time-controlled shaft 30 to lock said shaft against movement and which is caused to release said shaft by the oscillation of lever 46 when pin 44 enters notch 45.

In testimony whereof I affix my signature in presence of two witnesses.

JOHN KRUSE.

Witnesses:
CHARLES F. KOBER,
GOTTLIEB L. SING.